Figure 10:
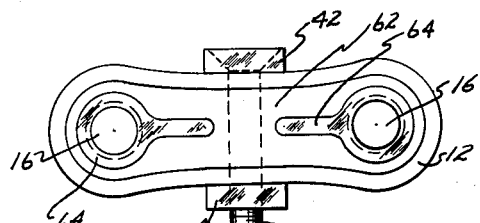

March 28, 1961 H. H. MERRIMAN 2,976,888
COUPLING FOR TUBE EXPANDER
Filed May 24, 1957 2 Sheets-Sheet 1
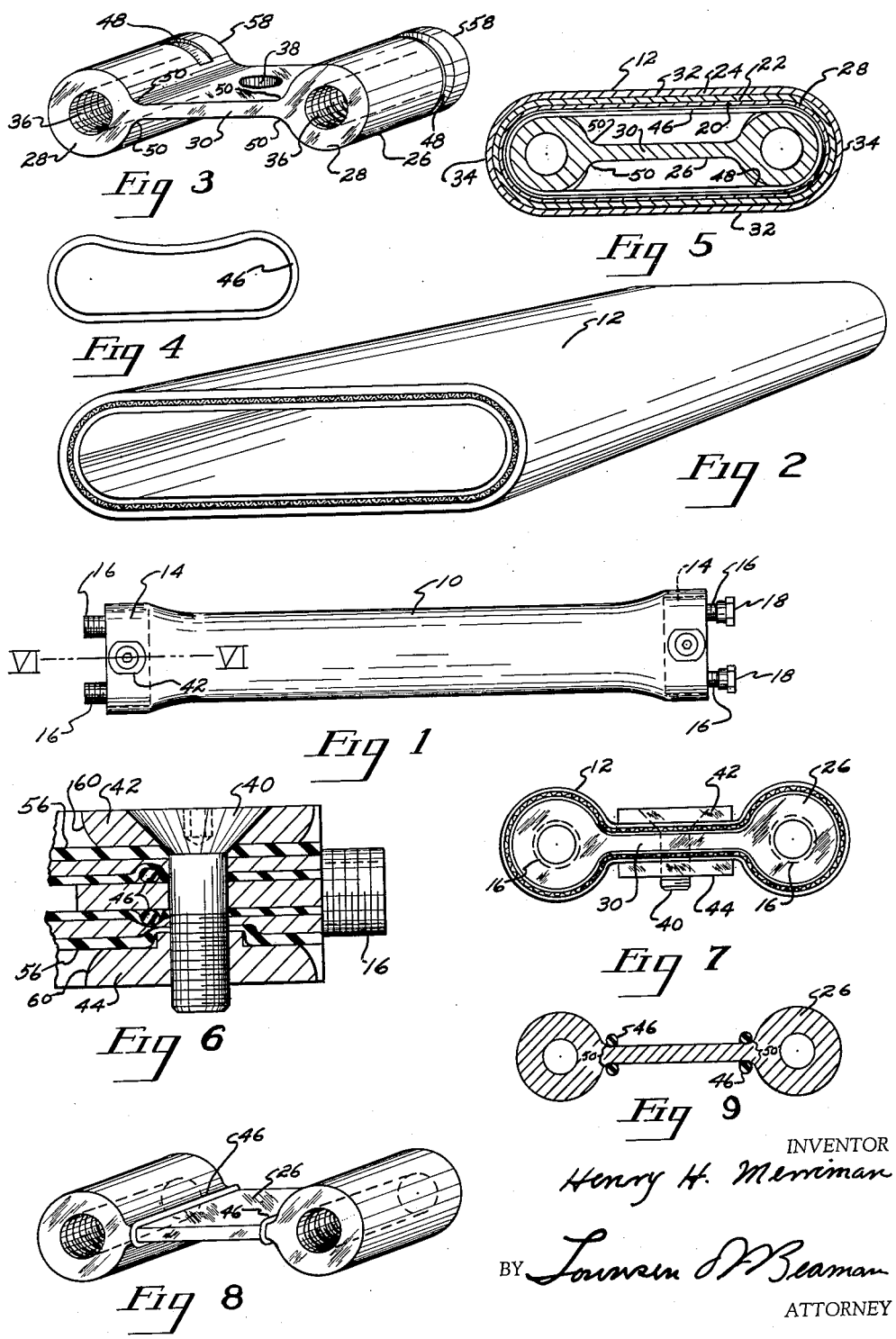
INVENTOR
Henry H. Merriman
BY
ATTORNEY March 28, 1961 H. H. MERRIMAN 2,976,888
COUPLING FOR TUBE EXPANDER
Filed May 24, 1957 2 Sheets-Sheet 2

INVENTOR
Henry H. Merriman

BY Lorrison O'Beaman
ATTORNEY

United States Patent Office 2,976,888
Patented Mar. 28, 1961

2,976,888

COUPLING FOR TUBE EXPANDER

Henry H. Merriman, 751 W. Washington Ave., Jackson, Mich.

Filed May 24, 1957, Ser. No. 661,506

13 Claims. (Cl. 137—784)

The present invention relates to improvements in fluid actuators fabricated from a cut length of tubular flexible hose, being particularly concerned with the construction and form of attachment of the means for closing one or both ends of the hose with a fluid coupling.

In general, the hose from which my improved fluid actuators are constructed is known as fire hose. It is usually of relatively thin wall construction having an extruded elastomer inner liner and an outer tube of reinforcing fabric to make the resulting hose relatively non-stretchable. The fabric reinforcement may be interwoven threads, either natural or synthetic, and will depend upon the operating range of pressure. Cotton, fiber glass, nylon, "Dacron," to mention a few, are some of the materials used in the fabric reinforcement.

So-called fire hose and hose of similar construction is characterized by the fact that it may be readily collapsed into a flat tube and coiled upon itself. To this end the inner extruded elastomer liner of the hose may even be cured as a flattened tube so as to have an inherent tendency to assume that form. Also, it has been proposed to omit the bonding between the inner liner and the fabric reinforcement at the longitudinal edges of the flattened inner liner to reduce the tendency for the fabric when bonded to the inner liner to resist being flattened.

While the principles of the invention are not limited to the size of the hose, in practice the actuators are being fabricated from cut lengths of hose having interior diameters, when inflated into circular form, over a range of 1" to 12" or more with wall thickness of the range of 1/8" to 5/32". The hose may either have the fabric reinforcement as its outer cover or it may have an elastomer over covering to protect the reinforcement from abrasion and other external conditions. Without sacrifices of the desired flexibility of the hose wall, hose capable of handling operating pressures in the range of 300 to 600 p.s.i. may be readily obtained upon the market.

In the use of a section of hose as a fluid actuator, the operating area of the flattened hose becomes of principal importance and the work to be performed is a factor of the fluid pressure and the active hose area. As the size of the hose is increased, end fittings of a construction heretofore used are not practical to seal and provide for fluid coupling structure at the ends of the hose sections. For example, the type of circular nipple and socket end fittings conventionally used upon fire hose, for the purpose of the invention, would be cumbersome, expensive, and unsuitable. Such circular fittings are not required because of fluid flow requirement and they would necessitate substantial displacement of the fitting end of the hose section from the opertaing portion of the hose functioning as a fluid actuator.

According to the present invention, an improved fluid actuator has been provided through the use of a section of hose of the type described having an end fitting which in shape is generally complementary to that of the flattened tubular form of the hose. As the interior of the flat hose is transversely elongated, the nipple structure of my novel end fitting is likewise transversely elongated. To seal the hose upon the nipple structure, external forces are applied to the nipple structure and hose. In one form the external forces seal the hose upon the nipple by a form of wrapping contraction of the hose while in another form the nipple structure is displaced within the hose to effect the seal. As fluid actuators must be capable of hundreds of thousands of cycles of operation without servicing in order to be practical, the end fitting has been so designed as not to be detrimental to the hose structure under conditions of flexure taking place immediately adjacent the fitting structure.

Thus, an object of the invention is to provide an improved fluid actuator fabricated from a cut section of hose of the type described and having an end fitting generally complementary to the hose when in the form of a flat tube.

Another object of the invention is to provide a novel end fitting for a flexible hose having an elongated interior opening.

Another object is to provide a fluid actuator in the form of a flat flexible hose having an end fitting in the form of a flat transversely elongated nipple structure.

A further object is to provide an end fitting for the fluid coupling of flexible hose of the type with a source of fluid pressure wherein the nipple structure comprises two partially cylindrical parallel portions held in spaced relation to each other by a connecting wall.

A still further object of the invention is to provide an end fitting having a nipple structure of elongated transverse cross section which is adapted to be snugly fitted into the transversely elongated bore of a flattened hose end of a hose of the described type, the nipple structure having spaced parallel partially cylindrical portions about which the longitudinally extending edges of the flattened hose end are wrapped, there being a transverse wall portion connecting said cylindrical portions bridged by the opposed sides of the flattened hose end and exterior clamping structure for clamping the opposed sides of the hose end to the connecting wall to seal the hose end upon the nipple structure.

Another object is to provide an end fitting of the type described in the preceding paragraph wherein the exterior of the nipple structure is displaceable elastomer material.

Another object of the invention is to provide an end seal and fluid pressure connection for the flattened end of a thin wall collapsible flexible hose comprising a generally flat nipple to be received in the flattened bore of the hose and tending to extend the hose transversely, a longitudinally extending fluid passage defined in the nipple and having means for connection to a fluid conduit, and external clamp structure for producing relative displacement between the hose end and the nipple to effect a seal between the wall of the nipple and the bore of the hose.

These and other objects and advantages residing in the construction, arrangement and combination of parts will more fully appear from the following specification and the appended claims.

Figure 11:
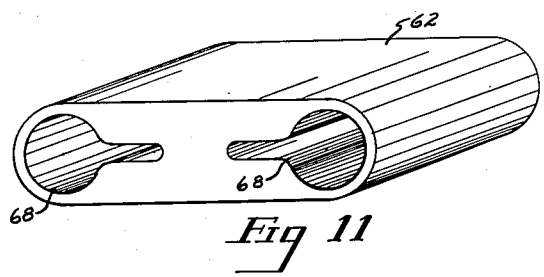
Figure 12:
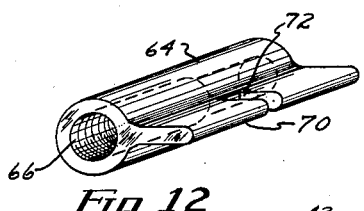
Figure 13:
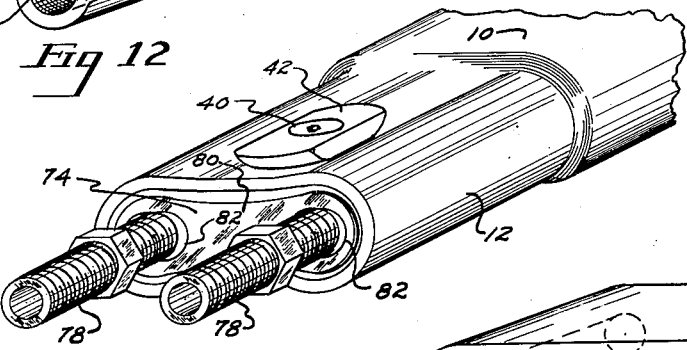
Figure 14:
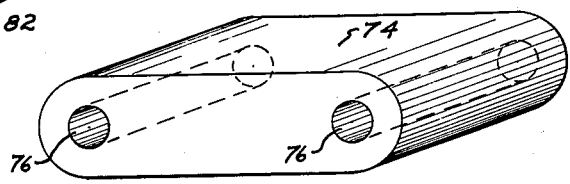
Figure 16:
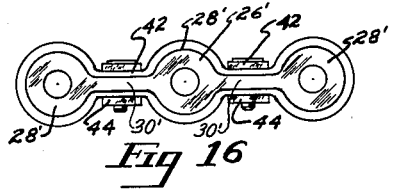
Figure 15:
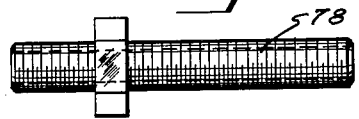
Figures 17, 18:
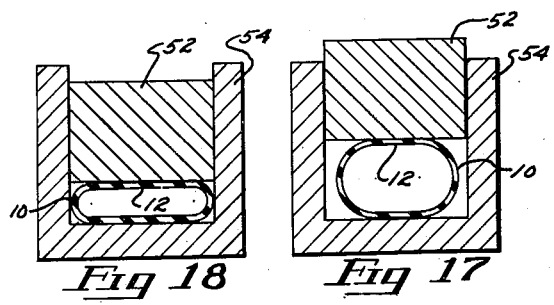

In the drawings:

Fig. 1 is a plan view of a fluid actuator involving the principles of construction of the present invention, Fig. 2 is a perspective view of a section of hose from which the actuator of Fig. 1 may be fabricated, Fig. 3 is a view similar to Fig. 2 of the nipple construction, Fig. 4 is a view of the sealing ring, Fig. 5 is a cross-sectional view of the hose and nipple assembly prior to application of the exterior clamp, Fig. 6 is a cross-sectional view taken on line VI—VI of Fig. 1, Fig. 7 is an enlarged end view taken from the left of the actuator shown in Fig. 1, Fig. 8 is a perspective view of the nipple showing the sealing rings in position, Fig. 9 is a cross-sectional view of Fig. 8, Fig. 10 is a view similar to Fig. 7 of another form of the invention, Fig. 11 is a view similar to Fig. 3 of the modified nipple of Fig. 10, Fig. 12 is a perspective view of the insert of Fig. 10, Fig. 13 is a perspective view of another form of the invention, Fig. 14 is a view similar to Fig. 11 of a modified form of the nipple, Fig. 15 is a side-elevational view of the threaded connector used in the form of Fig. 13, Fig. 16 is a view similar to Fig. 7 showing the form of the nipple construction as applied to a large size hose, and Figs. 17 and 18 are sectional views of the actuator shown in two different positions within a fixture.

Referring to the drawings, in Fig. 1 is shown a fluid actuator 10 which in practice may be inexpensively fabricated from a cut section of flexible fire hose 12 shown in Fig. 2. Actuator 10 is shown with similar end fitting, generally designated by reference character 14 at opposed ends. However, it will be understood that only one end of the actuator 10 need be sealed by the nipple structure of the present invention to obtain the benefits thereof and that the other end of the hose may be sealed in any other suitable manner. As shown, the threaded connectors 16 extending from the right hand end fitting 14 of Fig. 2 are sealed by threaded caps 18.

The hose 12 is shown with an elastomer inner liner 20 which in practice is usually extruded and may be cured as a flattened tubular component to increase the tendency for the hose to assume a flattened form. Embracing the liner 20 is an interwoven fabric reinforcement 22 to support the liner 20 against fluid pressure, the reinforcement 22 rendering the hose substantially stretchless under fluid pressure conditions contemplated in service. A protective covering 24 of elastomer is shown applied to reinforcement 22. However, the covering 24 need not be present in all cases and its use depends upon the conditions under which the actuator 10 is to be used. Obviously, the covering 24, as in the case of any laminate, tends to stiffen the body of the hose and to change the static condition of the hose from a generally flat form toward a more pronounced elliptical form. It is to be understood that many forms of commercial hose now on the market are suitable for the purpose of the present invention and that the hose per se forms no part of the invention.

In both of the illustrated forms of the nipple structure the basic concept of sealing the hose bore to the nipple structure is the same, namely, by producing a relative displacement between the hose and the nipple structure to effectively wrap or fit the hose and nipple in sealing relation. In the form in which the nipple is of relatively rigid, non-displaceable structure, as shown in Fig. 3, the external clamping structure displaces the hose to wrap the same in sealing relation with the nipple. In the form of Figs. 11 and 14 at least the exterior body of the nipple is of elastomer material capable of displacement to effect the seal with the hose.

As shown in Fig. 3, the nipple 26 is a substantially rigid section of metal, plastic or other suitable structural material, cast, molded, extruded, machined or otherwise fabricated. In practice, the nipple 26 has two or more spaced parallel partially cylindrical portions 28 connected by a wall or web 30, preferably of lesser thickness than the outside diameter of the portions 28 so that at least one side of the hose 12 will be in spaced bridging relation with the wall of the hose 12 when the nipple 26 is snuggly inserted into the bore of a flattened end of the hose 12.

It will be understood that the outside diameter of the portions 28 and their spacing is such that the nipple 26, when inserted into an end of the hose with a snug fit, will extend the hose transversely from any circular or elliptical form it may tend to assume in a static state into a flat form having opposed substantially parallel side portions 32 and longitudinal semi-cylindrical edge portions 34 as shown Fig. 5.

When the nipple 26 is used solely to seal one end of the actuator 10 no provision need be made for connection with a fluid conduit. However, when the nipple 26 is to both seal and conduct fluid to and from the interior of the actuator 10, one or both of the portions 28 may be provided with a passage 36 and tapped to receive the threaded connection 16.

Depending upon the form of the external clamping structure, one or more holes 38 may be provided in the wall 30 to receive the clamp bolt 40 which functions to draw the plates 42 and 44 toward the wall 30 to wrap the hose about the nipple 26 in the manner shown in Fig. 7.

Prior to insertion of the nipple 26 into one end of the hose 12 the elastomer seal ring 46 may be stretched upon the nipple 26 and disposed in the grooves 48 as shown in Figs. 3 and 5 to provide a sealing filler along the junctions 50 between the wall 30 and the cylindrical portion 28. In lieu of positioning the ring 46 as shown in Fig. 5 or in addition thereto, a pair of rings 46 may be located in the junctions 50 in the manner shown in Figs. 8 and 9. It will be appreciated that the sealing pressure developed between the nipple 26 and the hose 12 by the action of the bolt 40 upon the plates 42 and 44 is at a minimum in the locality of the junction 50 and this situation is corrected by the ring 46 located as shown in either Fig. 5 or Fig. 8.

When the actuator 10 is used, as shown in Figs. 17 and 18 to effect movement of the member 52 relative to the member 54 by inflating the hose 12 by fluid pressure, as shown in Fig. 17 from the deflated form of Fig. 18, flexure will take place at 56 as shown in Fig. 6 directly adjacent the one end of nipple 26 and the plates 42 and 44. To avoid detrimental abrasion and stresses occuring adjacent the end fitting it is considered advisable to round the edges 58 of the portion 28 at one end of the nipple 26 as well as the edges 60 of the plates 42 and 44. It will be noted that the edges 60 of the plates 42 and 44 are rounded in both elevation and plan so that the pressure of the plates 42 and 44 adjacent 56 is across substantially all the threads of the fabric reinforcement 22 and rather than parallel to one set of threads. The plates 42 and 44 may be economically fabricated upon an automatic lathe to the shape shown.

Referring to Figs. 10, 11 and 12, in Fig. 10 is shown an end view corresponding to Fig. 7 of a modification in which the nipple structure comprises a main body portion 62 of elastomer material shaped to snuggly fit with the hose 12. Inserts 64 having threaded passages 66 are either molded into position or if the body 62 is extruded or molded in the form shown in Fig. 11 the insert 64 of Fig. 12 may be inserted into the correspondingly shaped cavities 68. The flange 70 will keep the insert 64 from rotating with the body 62. The action of the plates 42 and 44 through the bolt 40 will displace the elastomer material of the body 62 with the hose 12 to effect a seal between the hose 12 and the body 62. Displacement of material into the notch 72 will act to key the insert 64 into position.

A slight variation of the form of the invention of

Fig. 10 is illustrated in Figs. 13, 14 and 15. As shown, the elastomer nipple 74 has a cored hole 76 into which the threaded conduit connectors 78, shown in Fig. 15, are screwed. The nipple 74 corresponds to the body 62 and is shaped and displaced into sealing relation within the hose 12 in the same manner. To control the direction of displacement of the material of the nipple 74, a plate 80 may engage the outer end of the nipple 74 with the connection 78 holding the same in position. The holes 82 of the plate 80 are shown elongated to enable lateral displacement of the connector 78 upon tightening of the bolt 40 with resulting displacement of the nipple 74 within the hose 12. It will be appreciated that the elastomer material from which the body 62 and nipple 74 are formed provides an ideal surface of contact with the hose 12 at the point of flexure 56 of Fig. 6.

With extremely large size hose it may be desirable to multiply the construction of the nipple 26 of Fig. 3 in the manner indicated by the nipple construction 26' of Fig. 16 wherein three partially cylindrical portions 28' are spaced by intermediate wall sections 30'. The clamping action is similar to that of the construction of Fig. 6 with the exception that two sets of plates 42 and 44 are employed.

Depending upon the operating pressures and the porosity of the hose bore and end fitting structure, it may become necessary to employ a suitable sealing and bonding material between the engaging surfaces of the hose and the nipple structure. Numerous forms of well known cements and bonding materials may be used for this purpose. For example, rubber, resinous and asphaltic compounds used in cementing automobile trim and the like and characterized by non-hardening have proven satisfactory. This is particularly true where the actuator herein disclosed is being used with compressed air which is normally available in manufacturing concerns in a pressure range of 80 to 150 p.s.i.

I claim:

1. An actuator adapted to be connected to a source of fluid pressure, said actuator being in the form of a section of collapsible-expansible flexible hose, means for closing the ends of said hose to form a fluid chamber including an end fitting, said hose having a flexible wall which assumes cylindrical shape under fluid pressure yet the wall is readily collapsible into a flattened tubular shape to present an elongated bore to receive an elongated end fitting with a snug fit, said end fitting being elongated transversely of the hose and having a fluid passage defined therein and communicating with said chamber, and means for effecting relative displacement between said end fitting and said hose end to bring the walls of said fitting and said hose end into intimate fluid sealing relation.

2. An actuator as defined in claim 1, said end fitting including a nipple in the form of a pair of partially cylindrical parallel portions connected by a wall, opposed sides of said flattened hose end bridging said wall, said means engaging said opposed sides of said hose and clamping said wall between said hose sides of effect said relative displacement.

3. In combination with a flexible hose, an end fitting comprising a perforated nipple structure having a shape generally complementary to a flattened end of said hose and adapted to snuggly fit within the transversely elongated bore of the flattened hose end, said structure having spaced longitudinal edge portions conforming to the longitudinal edges of the flattened bore of the hose and a wall spacing said edge portions.

4. The combination as defined in claim 3 wherein said wall is of lesser thickness than said edge portions, and means clamping opposed sides of said hose bridging said wall portion in pressure contact with said wall portion.

5. In combination with a flexible hose, an end fitting comprising a perforated nipple having a pair of partially cylindrical edge portions spaced by a connecting wall, and external clamping structure for wrapping said hose upon said portions and for pressing the same upon said wall to seal a flattened end of said hose.

6. The combination as defined in claim 5 wherein said wall is relatively flat.

7. The combination as defined in claim 5 wherein said wall is of lesser thickness than the diameter of said cylindrical edge portions.

8. The combination as defined in claim 5 wherein a conduit passage is defined in at least one of said cylindrical end portions.

9. The combination as defined in claim 5 having a pair of plates located between said cylindrical portions on opposite sides of said wall and adapted to compress said hose between said plates and said wall and means for clamping said plates upon said wall.

10. The combination as defined in claim 9 wherein said plates are radiused in the area of hose flexure.

11. In combination with a flexible hose, an end fitting comprising a nipple having partially cylindrical edge portions spaced by a connecting wall disposed in the diametrical plane of said edge portions, and clamp plates disposed upon opposite sides of said wall for urging the opposed hose sides toward said plane and into contact with said wall and into wrapped relation to said cylindrical portions.

12. The combination as defined in claim 11 wherein said wall is of lesser thickness than the diameter of said cylindrical edge portions, and separate sealing means disposed in the junction of said wall and said cylindrical edge portions.

13. In combination with the flattened end of a hose of the type described and defining a transversely elongated bore of elastomer material, an end fitting structure comprising a nipple elongated transversely of the hose and snuggly fitted in said bore and generally complementary thereto, clamping means externally applied to opposite sides of said hose and centrally of said nipple for clamping said hose to the sides of said nipple and for wrapping said hose around the edges of said nipple, and means bonding said bore defining material to said nipple to supplement the sealing function of said clamping means.

References Cited in the file of this patent

UNITED STATES PATENTS

| | | |
|---|---|---|
| 1,494,164 | Goldbeck | May 13, 1924 |
| 2,433,602 | Coss | Dec. 30, 1947 |
| 2,550,970 | Carpenter | May 1, 1951 |
| 2,594,639 | Gossett | Apr. 29, 1952 |
| 2,678,666 | Thies et al. | May 18, 1954 |
| 2,785,911 | Kaufman | Mar. 19, 1957 |
| 2,798,745 | Nelson | July 9, 1957 |
| 2,809,668 | Sipovic | Oct. 15, 1957 |